US006484499B2

(12) United States Patent
Coleman et al.

(10) Patent No.: US 6,484,499 B2
(45) Date of Patent: Nov. 26, 2002

(54) TWIN VARIABLE NOZZLE TURBINE EXHAUST GAS RECIRCULATION SYSTEM

(75) Inventors: Gerald N. Coleman, Peoria, IL (US); James J. Faletti, Spring Valley, IL (US); Dennis D. Feucht, Morton, IL (US); David A. Pierpont, Peoria, IL (US)

(73) Assignee: Caterpillar, Inc, Peoria, IL (US)

( * ) Notice: Subject to any disclaimer, the term of this patent is extended or adjusted under 35 U.S.C. 154(b) by 0 days.

(21) Appl. No.: 09/755,356

(22) Filed: Jan. 5, 2001

(65) Prior Publication Data

US 2002/0088231 A1 Jul. 11, 2002

(51) Int. Cl.$^7$ .................................................. F02B 33/44
(52) U.S. Cl. .......................... 60/612; 60/605.1; 123/562
(58) Field of Search .............................. 60/605.2, 612; 123/562

(56) References Cited

U.S. PATENT DOCUMENTS

| 3,250,068 | A | | 5/1966 | Vulliamy | |
|---|---|---|---|---|---|
| 4,563,132 | A | * | 1/1986 | Grimmer | 60/612 |
| 5,617,726 | A | * | 4/1997 | Sheridan et al. | 60/605.2 |
| 5,899,070 | A | * | 5/1999 | Droessler et al. | 60/612 |
| 6,202,414 | B1 | * | 3/2001 | Schmidt et al. | 60/605.2 |
| 6,205,785 | B1 | * | 3/2001 | Coleman | 60/605.2 |
| 6,263,673 | B1 | * | 7/2001 | Schmidt et al. | 60/612 |

FOREIGN PATENT DOCUMENTS

| JP | 63009616 A | * | 1/1988 | 60/612 |
|---|---|---|---|---|
| JP | 63009617 A | * | 1/1988 | 60/612 |
| JP | 405065830 A | * | 3/1993 | 123/562 |
| JP | 405071426 A | * | 3/1993 | 123/562 |
| JP | 406146908 A | * | 5/1994 | 123/562 |

* cited by examiner

Primary Examiner—Thomas Denion
Assistant Examiner—Thai-Ba Trieu

(57) ABSTRACT

An internal combustion engine, particularly suitable for a vehicle, is provided with a plurality of combustion cylinders, at least a first exhaust manifold and a second exhaust manifold and at least one intake manifold. Each exhaust manifold is coupled with a plurality of the combustion cylinders. Each intake manifold is coupled with a plurality of the combustion cylinders. A first turbocharger includes a first turbine having at least one inlet and an outlet, and a first compressor having an inlet and an outlet. Then at least one first turbine inlet has a controllable, variable intake nozzle fluidly coupled with the first exhaust manifold. A second turbocharger includes a second turbine having an inlet and an outlet, and a second compressor having an inlet and an outlet. The second turbine inlet has a controllable, variable intake nozzle fluidly coupled with the second exhaust manifold. The first compressor outlet is fluidly coupled with the second compressor inlet. The engine has improved performance, is compact in design and is economical in operation.

19 Claims, 1 Drawing Sheet

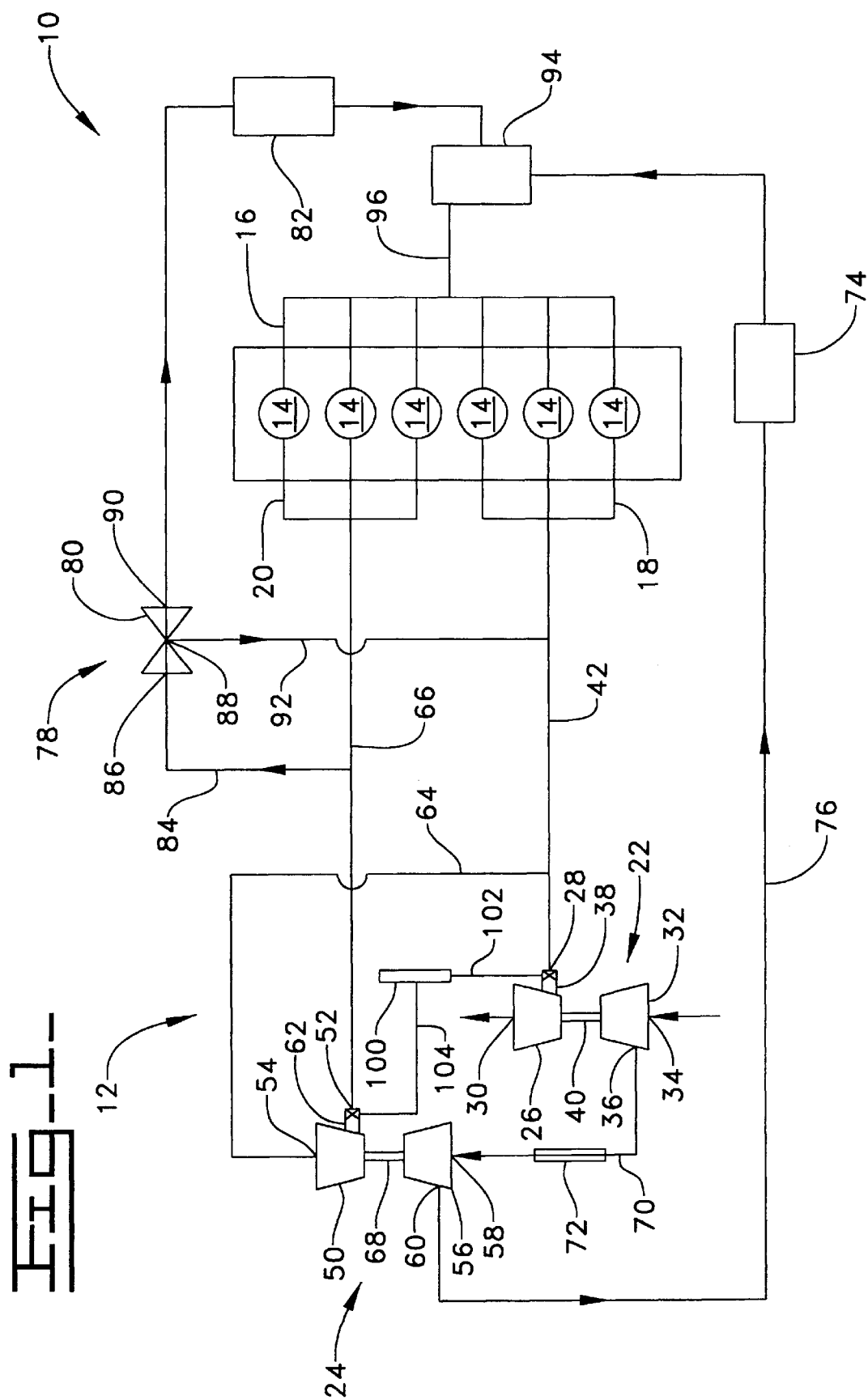
Fig_1

TWIN VARIABLE NOZZLE TURBINE EXHAUST GAS RECIRCULATION SYSTEM

TECHNICAL FIELD

The present invention relates to internal combustion engine turbochargers and exhaust gas re-circulation systems, and, more particularly, to an internal combustion engine having multiple exhaust gas manifolds, a twin turbine turbocharger and an exhaust gas re-circulation system.

BACKGROUND ART

An internal combustion engine may include one or more turbochargers for compressing a fluid to be supplied to one or more combustion chambers within corresponding combustion cylinders. Each turbocharger typically includes a turbine driven by exhaust gases of the engine, and a compressor driven by the turbine. The compressor receives the fluid to be compressed and supplies the compressed fluid to the combustion chambers. The fluid compressed by the compressor may be in the form of combustion air only, or may be a mixture of fuel and combustion air.

It is known to provide multiple turbochargers within a turbocharger system in an internal combustion engine. For example, U.S. Pat. No. 3,250,068 (Vulliamy) discloses an internal combustion engine having two turbochargers. A first turbocharger includes a turbine which is driven by a single exhaust manifold on the internal combustion engine. The spent exhaust gas from the turbine of the first turbocharger is transported in a series manner to the inlet of a turbine of the second turbocharger. The spent exhaust gas is then discharged to the ambient environment from the turbine of the second turbocharger. The compressor of the second turbocharger compresses ambient combustion air and provides the compressed combustion air in a series manner to the compressor of the first turbocharger, which in turn transports the compressed combustion air to the intake manifold of the engine.

A problem with a turbocharger system as described above is that the spent exhaust gas from the turbine of the first turbocharger may not have enough energy to provide a desired compression ratio within the second turbocharger. The overall compression ratio from the turbocharger system is thus limited according to the amount of energy available at the turbine of the second turbocharger.

An exhaust gas re-circulation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment. EGR systems primarily re-circulate the exhaust gas by-products into the intake air supply of the internal combustion engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides (NOx). Furthermore, the exhaust gases typically contain unburned hydrocarbons, which are burned on reintroduction into the engine cylinder, further reducing the amount of exhaust gas by-products emitted as undesirable pollutants from the internal combustion engine.

Dependent upon certain operating conditions associated with a diesel engine, it may be desirable to provided a richer or leaner mixture of the exhaust gas within the combustion air which is transported to the intake manifold. One known technique for controlling the amount of exhaust gas which is mixed with the combustion air utilizes controllably actuatable valves which interconnect the exhaust manifold with the compressor which receives the exhaust gas. The flow of exhaust gas to the second compressor can be completely shut off, or can be controlled on a timed basis to provide a desired average flow of exhaust gas which mixes with the combustion air. Another known technique is to provide a bypass fluid conduit associated with the combustion air or exhaust gas. A controllably actuatable butterfly valve or the like is positioned within the bypass fluid conduit and controlled to in turn control the amount of exhaust gas which mixes with the combustion air. Although such systems are effective to control exhaust gas re-circulation within the diesel engine, they usually require that additional structure in the form of sensors, conduits, valves and associated controllers be added to the internal combustion engine.

The present invention is directed to overcoming one or more of the problems as set forth above.

DISCLOSURE OF THE INVENTION

In one aspect of the invention, an internal combustion engine is provided with a plurality of combustion cylinders, a first exhaust manifold and a second exhaust manifold, and at least one intake manifold. Each exhaust manifold is coupled with a plurality of the combustion cylinders. Each intake manifold is coupled with a plurality of the combustion cylinders. A first turbocharger includes a first turbine having an inlet and an outlet, and a first compressor having an inlet and an outlet. The first turbine inlet has a controllable, variable intake nozzle fluidly coupled with the first exhaust manifold. A second turbocharger includes a second turbine having an inlet and an outlet, and a second compressor having an inlet and an outlet. The second turbine inlet has a controllable, variable intake nozzle fluidly coupled with the second exhaust manifold. The second compressor inlet is fluidly coupled with the first compressor outlet.

In another aspect of the present invention, a turbocharger system is provided, for use with an internal combustion engine having a plurality of combustion cylinders, an intake manifold and first and second exhaust manifolds. The turbocharger system has a first turbocharger including a first turbine having at least one inlet and an outlet, and a first compressor having an inlet and an outlet. The at least one first turbine inlet includes a controllable, variable intake nozzle, and is fluidly coupled with the first exhaust manifold. A second turbocharger includes a second turbine having an inlet and an outlet, and a second compressor having an inlet and an outlet. The second turbine inlet includes a controllable, variable intake nozzle, and is fluidly coupled with the second exhaust manifold. The second compressor inlet is fluidly coupled with the first compressor outlet.

In yet another aspect of the invention, a method of operating an internal combustion engine is provided with the steps of: providing a plurality of combustion cylinders, a first exhaust manifold, a second exhaust manifold and an intake manifold; transporting exhaust gas from a plurality of combustion cylinders to each said first exhaust manifold and said second exhaust manifold; providing a first turbocharger including a first turbine having at least one inlet and an outlet, and a first compressor having an inlet and an outlet; providing a second turbocharger including a second turbine having an inlet and an outlet, and a second compressor having an inlet and an outlet; providing a controllable, variable intake nozzle on each of the first turbine and the second turbine; rotatably driving the first turbine with exhaust gas introduced at the first turbine inlet from each the second turbine outlet and the first exhaust manifold; rotatably driving the second turbine with exhaust gas introduced at the second turbine inlet from the second exhaust manifold; introducing combustion gas at the first compressor inlet; transporting combustion gas from the first compressor outlet to the second compressor inlet; transporting compressed combustion gas from the second compressor outlet to the intake manifold; sensing at least one of operating conditions of the engine and performance of the turbochargers; and controlling at least one of the controllable, variable intake nozzles in response to at least one of the engine operating conditions and the performance of the turbochargers.

In a further aspect of the present invention, a turbocharger and engine emissions control system is provided for use with an internal combustion engine having a plurality of combustion cylinders, an intake manifold and first and second exhaust manifolds. The turbocharger system has a first turbocharger including a first turbine having a first inlet with a controllable variable intake nozzle and an outlet, and a first compressor having an inlet and an outlet. The first turbine inlet is fluidly coupled with the first exhaust manifold. A second turbocharger includes a second turbine having an inlet with a controllable variable intake nozzle and an outlet, and a second compressor having an inlet and an outlet. The second turbine inlet is fluidly coupled with the second exhaust manifold. The second compressor inlet is fluidly coupled with the first compressor outlet. The second compressor outlet is fluidly coupled with the intake manifold. An EGR duct is fluidly coupled to the second exhaust manifold and the intake manifold.

BRIEF DESCRIPTION OF THE DRAWINGS

The sole FIGURE is a schematic representation of an internal combustion engine, including turbocharger and exhaust gas re-circulation systems of the present invention.

BEST MODE FOR CARRYING OUT THE INVENTION

Referring now to the drawing, there is shown an embodiment of an internal combustion engine 10 including an embodiment of a turbocharger and exhaust gas re-circulation system 12 of the present invention.

Internal combustion engine 10 includes a plurality of combustion cylinders 14, such as the six combustion cylinders 14 shown in the drawing, each of which is coupled with a corresponding intake manifold 16 and exhaust manifold 18, 20. Internal combustion engine 10 includes one or more intake manifolds 16, and in the embodiment shown in the drawing includes a single intake manifold 16 which is fluidly coupled with each combustion cylinder 14, and provides an air mixture to each combustion cylinder 14, as will be described hereinafter. Internal combustion engine 10 also includes one or more exhaust manifolds 18, 20, and in the embodiment shown includes a first exhaust manifold 18 and a second exhaust manifold 20. First exhaust manifold 18 is fluidly coupled with three combustion cylinders 14, and second exhaust manifold 20 is fluidly coupled with the remaining three combustion cylinders 14. A fuel, such as diesel fuel, is injected into each combustion cylinder 14 and combusted therein, in known manner.

Turbocharger system 12 includes a first turbocharger 22 and a second turbocharger 24. First turbocharger 22 includes a first turbine 26 having an inlet 28 and an outlet 30, and a first compressor 32 having an inlet 34 and an outlet 36. First turbine 26 inlet 28 includes a controllably actuatable variable intake nozzle 38 at inlet 28, with a constriction area which may be controllably adjusted to thereby provide an inlet orifice to first turbine 26 with a varying area. By varying the area of intake nozzle 38, the flow rate through first turbine 26 is controlled, which in turn controls the rotational output speed of first turbine 26.

First turbine 26 is mechanically coupled with first compressor 32, such as by a shaft 40, and thereby rotatably drives first compressor 32. First turbine inlet 28 is fluidly coupled with exhaust manifold 18 via a fluid conduit 42, and receives exhaust gas therefrom for rotatably driving first turbine 26. First turbine outlet 30 discharges spent exhaust gas to an exhaust gas system (not shown), and then to an ambient environment. First compressor inlet 34 receives combustion air from the ambient environment, for compressing within first compressor 32.

Second turbocharger 24 includes a second turbine 50 having an inlet 52 and an outlet 54, and a second compressor 56 having an inlet 58 and an outlet 60. Second turbine 50 inlet 52 includes a controllably actuatable variable intake nozzle 62 at inlet 52, with a constriction area which may be controllably adjusted to thereby provide an inlet orifice to second turbine 50 with a varying area. By varying the area of intake nozzle 62, the flow rate through second turbine 50 is controlled, which in turn controls the rotational output speed of second turbine 50.

Second turbine outlet 54 is fluidly coupled with first turbine inlet 28 via a fluid conduit 64 fluidly interconnecting outlet 54 with fluid conduit 42. It should be understood that first turbine 26 also could be provided with a second inlet to which fluid conduit 64 is fluidly connected. Second turbine 50 inlet 52 is fluidly coupled with second exhaust manifold 20 via a fluid conduit 66.

Second compressor 56 is mechanically coupled with and rotatably driven by second turbine 50 via a shaft 68. Second compressor inlet 58 is fluidly coupled with first compressor outlet 36 via a fluid conduit 70. An optional intercooler 72 is disposed in fluid communication with fluid conduit 70, for cooling compressed combustion gas transported from first compressor 32 to second compressor 56. An aftercooler 74 is disposed in fluid communication with a fluid conduit 76, which fluidly couples second compressor 56 outlet 60 with intake manifold 16.

An engine emissions control system in the form of an EGR system 78 fluidly interconnects second exhaust manifold 20 with intake manifold 16. A valve 80 and cooler 82 are positioned in fluid communication with an EGR duct 84. Valve 80 controls a flow of exhaust gas re-circulated from exhaust manifold 20 to intake manifold 16. Cooler 82 acts as a heat exchanger, to cool the exhaust gas re-circulated to intake manifold 16.

Valve 80 includes an inlet 86, a first outlet 88 and a second outlet 90. Inlet 86 is fluidly coupled with EGR duct 84. Valve first outlet 88 is fluidly coupled with fluid conduit 42 via a fluid conduit 92. Valve second outlet 90 is fluidly coupled with EGR duct 84.

A mixer 94 receives exhaust gas flow from EGR duct 84 and compressed combustion fluid flow from fluid conduit 76, and supplies a mixture thereof to intake manifold 16 via a fluid conduit 96.

A controller 100 is coupled to and receives input data from engine and turbocharger operating and performance sensors (not shown). Controller 100 transmits control signals via a first signal line 102 to variable intake nozzle 38, and via a second signal line 104 to variable intake nozzle 62, for controlling and adjusting the diameters thereof.

INDUSTRIAL APPLICABILITY

During use of engine 10 and system 12, fuel, such as diesel fuel is injected into combustion cylinders 14 and combusted when a piston (not shown) disposed within each combustion cylinder 14 is at or near a top dead center (TDC) position. Exhaust gas is transported from each combustion cylinder 14 to the exhaust manifold associated with it, either first exhaust manifold 18 or second exhaust manifold 20. Exhaust gas within first exhaust manifold 18 is transported to first turbine 26 via fluid conduit 42, for rotatably driving first turbine 26. First turbine 26 in turn rotatably drives first compressor 32 via shaft 50.

In response to data on engine operating conditions, or data on performance of the turbochargers received by controller 100, the controllable variable intake nozzle 38 at inlet 28 is adjusted. For example, a sensor or sensors, not shown, may sense engine load condition, engine coolant temperature, combustion air inlet temperature or an engine start-up condition, as well as various performance data obtained from first turbocharger 22 and second turbocharger 24. Data sensed is transmitted to and processed by controller 100, which sends control signals to variable nozzle 38 over first signal line 102. By varying the area of variable intake nozzle 38, the flow rate through first turbine 26 is controlled, which in turn controls the rotational output speed of first turbine 26 and shaft 40, and therefore the rotational speed and performance of first compressor 32.

Concurrently, exhaust gas from exhaust manifold 20 is transported to second turbine inlet 52 via fluid conduit 66 for driving second turbine 50. Second turbine 50 in turn rotatably drives second compressor 56 via shaft 68. The spent exhaust gas from second turbine 50 flows from second turbine outlet 54 through fluid conduit 64 to fluid conduit 42 for rotatably driving first turbine 26. The spent exhaust gas is discharged from first turbine 26 outlet 30 to the ambient environment through a suitable exhaust gas system (not shown).

In response to data obtained on engine operating conditions, or data on performance of the turbochargers, the controllable variable intake nozzle 62 at inlet 52 of second turbine 50 is adjusted. For example, a sensor or sensors (not shown) may sense engine load condition, engine coolant temperature, combustion air inlet temperature or an engine start-up condition, as well as various performance data obtained from first turbocharger 22 and second turbocharger 24, which is transmitted to and processed by controller 100. Control signals are sent from controller 100 to variable intake nozzle 62 over second signal line 104. By varying the area of the variable intake nozzle 62 at inlet 52, the flow rate through second turbine 50 is controlled, which in turn controls the rotational output speed of second turbine 50, and therefore the rotational speed and performance of second compressor 56, which is driven by second turbine 50.

First compressor 32 draws combustion air into first compressor inlet 34. The combustion air is compressed within first compressor 32, and is discharged from first compressor 32 outlet 36 through fluid conduit 70. The compressed combustion air is cooled within intercooler 72, and is transported to second compressor inlet 58 for further compressing within second compressor 56. First compressor 32 and second compressor 56 thus form a multi-stage compressor for compressing combustion air which is provided to intake manifold 16.

The compressed combustion air is transported from second compressor 56 outlet 60 through fluid conduit 76 to aftercooler 74. The compressed combustion air is again cooled within aftercooler 74, and is transported to intake manifold 16 via mixer 94 and fluid conduit 96, for use in combustion occurring within combustion cylinders 14.

Exhaust gas is re-circulated from second exhaust manifold 20 to intake manifold 16 via EGR duct 84, mixer 94 and fluid conduit 96. Valve 80 is controllably actuated via suitable electrical circuitry (not shown) to control the amount of exhaust gas which is re-circulated to intake manifold 16. Cooler 82 is used to cool the exhaust gas which is re-circulated to intake manifold 16.

Valve 80 functions both to regulate the flow of exhaust gas which is mixed with the combustion air transported to intake manifold 16, as well as to provide exhaust gas to first turbocharger 22. Controlling or regulating the amount of exhaust gas transported to intake manifold 16 provides an effective exhaust gas re-circulation system within internal combustion engine 10. Moreover, controlling a flow of exhaust gas to fist turbine 26 utilizes energy from the exhaust gas not transported to intake manifold 16 to drive first turbine 26.

Valve 80 is selectively actuated to control the flow of exhaust gas from valve 80 first outlet 88 and/or second outlet 90. Exhaust gas flowing from valve 80 first outlet 88 flows through fluid conduit 92, and mixes with exhaust gas from first exhaust manifold 18, flowing to first turbine 26 inlet 28 via fluid conduit 42. Exhaust gas from valve 80 second outlet 90 is cooled within EGR cooler 82 and then transported to mixer 94 for mixing with the combustion air compressed by first compressor 32 and second compressor 56, and cooled by interstage cooler 72 and aftercooler 74. The mixture of combustion air and exhaust gas is then transported to intake manifold 16 via fluid conduit 96.

The present turbocharger and EGR system provides a high level of control and performance. In response to engine operating characteristics, or performance of the turbochargers, or both, any or all of the controllable variable intake nozzles 38 and 62 and EGR valve 80 can be adjusted, providing optimal control of turbocharger performance and EGR flow rate.

EGR valve 80 can be used to control EGR flow rate to intake manifold 16 and turbines 26 and 50. Variable nozzle 38 at inlet 28 of first turbine 26 can be controlled to improve engine load acceptance and engine braking by controlling the performance of first turbine 26, and thus the performance of first compressor 32. System 12 has good fuel consumption characteristics, and excellent EGR flow rate control with controllable variable intake nozzle 62 at inlet 52 of second turbine 50.

The turbocharger system of the present invention provides multiple turbochargers with turbines and compressors fluidly coupled together in a series arrangement to provide improved performance and efficiency. The first turbocharger has a turbine that receives exhaust gas from both an exhaust manifold and from the turbine of the second turbocharger. By utilizing the spent exhaust gas from the second turbocharger, the energy associated therewith may be recaptured, along with the energy from the exhaust manifold, and utilized to drive the turbine of the first turbocharger. The turbocharger system is compact, efficient and provides compressed air with a relatively high compression ratio to the intake manifold.

Other aspects, objects and advantages of this invention can be obtained from a study of the drawings, the disclosure and the appended claims.

What is claimed is:

1. An internal combustion engine, comprising:
   a plurality of combustion cylinders;
   a first exhaust manifold and a second exhaust manifold, each said first exhaust manifold and said second exhaust manifold coupled with a different plurality of said combustion cylinders;
   at least one intake manifold, each said intake manifold coupled with a plurality of said combustion cylinders;
   a first turbocharger including a first turbine having an inlet and an outlet, and a first compressor having an inlet and an outlet, said first turbine inlet having a controllable variable intake nozzle fluidly coupled with said first exhaust manifold; and
   a second turbocharger including a second turbine having an inlet and an outlet, and a second compressor having an inlet and an outlet, said second turbine inlet having a controllable variable intake nozzle fluidly coupled with said second exhaust manifold, said second compressor inlet fluidly coupled with said first compressor outlet.

2. The internal combustion engine of claim 1, including an exhaust gas re-circulation duct fluidly interconnecting at least one of said first exhaust manifold and said second exhaust manifold to said at least one intake manifold.

3. An internal combustion engine, comprising:
   a plurality of combustion cylinders;
   a first exhaust manifold and a second exhaust manifold, each said first exhaust manifold and said second exhaust manifold coupled with a plurality of said combustion cylinders;
   at least one intake manifold, each said intake manifold coupled with a plurality of said combustion cylinders;
   a first turbocharger including a first turbine having an inlet and an outlet, and a first compressor having an inlet and an outlet, said first turbine inlet having a controllable variable intake nozzle fluidly coupled with said first exhaust manifold;
   a second turbocharger including a second turbine having an inlet and an outlet, and a second compressor having an inlet and an outlet, said second turbine inlet having a controllable variable intake nozzle fluidly coupled with said second exhaust manifold, said second compressor inlet fluidly coupled with said first compressor outlet;
   an exhaust gas re-circulation duct fluidly interconnecting at least one of said first exhaust manifold and said second exhaust manifold to said at least one intake manifold; and
   an exhaust gas re-circulation valve disposed in said exhaust gas re-circulation duct, said exhaust gas re-circulation valve having an inlet in fluid communication with said second exhaust manifold, a first outlet in fluid communication with said first turbine, and a second outlet in fluid communication with said at least one intake manifold.

4. The internal combustion engine of claim 3, said first turbine inlet being fluidly coupled with said second turbine outlet.

5. The internal combustion engine of claim 1, said first turbine inlet being fluidly coupled with said second turbine outlet.

6. The internal combustion engine of claim 5, including an exhaust gas re-circulation duct fluidly interconnecting said second exhaust manifold and said at least one intake manifold, and a valve and a cooler associated with said exhaust gas re-circulation duct.

7. The internal combustion engine of claim 3, including an aftercooler fluidly interconnecting said second compressor outlet and said at least one intake manifold.

8. The internal combustion engine of claim 7, including an intercooler fluidly interconnecting said first compressor outlet and said second compressor inlet.

9. A turbocharger system for use with an internal combustion engine having a plurality of combustion cylinders, an intake manifold and first and second exhaust manifolds receiving exhaust flow from different ones of the combustion cylinders of said plurality of combustion cylinders, said turbocharger system comprising:
   a first turbocharger including a first turbine having at least one inlet and an outlet, and a first compressor having an inlet and an outlet, said at least one first turbine inlet including a controllable, variable intake nozzle and being fluidly coupled with the first exhaust manifold to receive exhaust flow from some of the combustion cylinders; and
   a second turbocharger including a second turbine having an inlet and an outlet, and a second compressor having an inlet and an outlet, said second turbine inlet including a controllable, variable intake nozzle and being fluidly coupled with said second exhaust manifold to receive exhaust flow from others of the combustion cylinders, and said second compressor inlet being fluidly coupled with said first compressor outlet.

10. The turbocharger system of claim 9, including an exhaust gas re-circulation duct interconnecting at least one of said first exhaust manifold and said second exhaust manifold to said intake manifold.

11. A turbocharger system for use with an internal combustion engine having a plurality of combustion cylinders, an intake manifold and first and second exhaust manifolds, said turbocharger system comprising:
   a first turbocharger including a first turbine having at least one inlet and an outlet, and a first compressor having an inlet and an outlet, said at least one first turbine inlet including a controllable, variable intake nozzle and being fluidly coupled with the first exhaust manifold;
   a second turbocharger including a second turbine having an inlet and an outlet, and a second compressor having an inlet and an outlet, said second turbine inlet including a controllable, variable intake nozzle and being fluidly coupled with said second exhaust manifold, and said second compressor inlet being fluidly coupled with said first compressor outlet;
   an exhaust gas re-circulation duct interconnecting at least one of said first exhaust manifold and said second exhaust manifold to said intake manifold; and
   an exhaust gas re-circulation valve disposed in said exhaust gas re-circulation duct, said exhaust gas re-circulation valve having an inlet in fluid communication with said second exhaust manifold, a first outlet in fluid communication with said first turbine at least one inlet, and a second outlet in fluid communication with said intake manifold.

12. The turbocharger system of claim 11, said first turbine at least one inlet being fluidly coupled with said first exhaust manifold, and with said second turbine outlet.

13. The turbocharger system of claim 9, said first turbine at least one inlet being fluidly coupled with said second turbine outlet.

14. The turbocharger system of claim 13, including an exhaust gas re-circulation duct fluidly interconnecting said second exhaust manifold and said intake manifold, and a valve and a cooler associated with said exhaust gas re-circulation duct.

15. The turbocharger system of claim 11, including an aftercooler fluidly interconnecting said second compressor outlet and said intake manifold.

16. The turbocharger system of claim 15, including an intercooler fluidly interconnecting said first compressor outlet and said second compressor inlet.

17. A method of operating an internal combustion engine, comprising the steps of:

providing a plurality of combustion cylinders, a first exhaust manifold, a second exhaust manifold and an intake manifold; transporting exhaust gas from a plurality of said combustion cylinders to each said first exhaust manifold and said second exhaust manifold;

providing a first turbocharger including a first turbine having at least one inlet and an outlet, and a first compressor having an inlet and an outlet;

providing a second turbocharger including a second turbine having an inlet and an outlet, and a second compressor having an inlet and an outlet;

providing a controllable, variable intake nozzle on each of said first turbine at least one inlet and said second turbine inlet;

rotatably driving said first turbine with exhaust gas introduced at said first turbine at least one inlet from each said second turbine outlet and said first exhaust manifold;

rotatably driving said second turbine with exhaust gas introduced at said second turbine inlet from said second exhaust manifold;

introducing combustion gas at said first compressor inlet;

transporting combustion gas from said first compressor outlet to said second compressor inlet;

transporting compressed combustion gas from said second compressor outlet to said intake manifold;

sensing at least one of operating conditions of said engine and performance of said turbochargers; and controlling at least one of said controllable variable intake nozzles in response to at least one of said engine operating conditions and said performance of said turbochargers.

18. The method of claim 17, including the steps of providing an exhaust gas recirculation duct interconnecting at least one of said first exhaust manifold and said second exhaust manifold with said intake manifold, and re-circulating exhaust gas in said exhaust gas re-circulation duct.

19. A turbocharger and engine emissions control system for use with an internal combustion engine having a plurality of combustion cylinders, an intake manifold and first and second exhaust manifolds, said turbocharger and engine emissions control system comprising:

a first turbocharger including a first turbine having a first inlet including a controllable variable intake nozzle and an outlet, and a first compressor having an inlet and an outlet, said first turbine inlet fluidly coupled with the first exhaust manifold;

a second turbocharger including a second turbine having an inlet including a controllable variable intake nozzle and an outlet, and a second compressor having an inlet and an outlet, said second turbine inlet fluidly coupled with said second exhaust manifold, said second compressor inlet fluidly coupled with said first compressor outlet, and said second compressor outlet fluidly coupled with the intake manifold;

an EGR duct fluidly coupled to said second exhaust manifold and said intake manifold; and a valve in said EGR duct, said valve having an inlet fluidly coupled to said second exhaust manifold, and an outlet fluidly coupled to said intake manifold.

* * * * *